(12) United States Patent
Mikawa

(10) Patent No.: US 9,897,820 B2
(45) Date of Patent: Feb. 20, 2018

(54) IMAGE PROJECTION APPARATUS

(71) Applicant: Akihisa Mikawa, Kanagawa (JP)

(72) Inventor: Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/206,962

(22) Filed: Jul. 11, 2016

(65) Prior Publication Data

US 2017/0017092 A1 Jan. 19, 2017

(30) Foreign Application Priority Data

Jul. 16, 2015 (JP) ................... 2015-142359

(51) Int. Cl.
*G03B 21/14* (2006.01)
*H04N 9/31* (2006.01)
*G02B 27/64* (2006.01)

(52) U.S. Cl.
CPC ........... *G02B 27/646* (2013.01); *G03B 21/14* (2013.01); *H04N 9/317* (2013.01); *H04N 9/3114* (2013.01); *G03B 21/142* (2013.01); *G03B 21/147* (2013.01); *H04N 9/3102* (2013.01)

(58) Field of Classification Search
CPC .. G03B 21/005; G03B 21/006; G03B 21/008; G03B 21/14; G03B 21/142; G03B 21/147; H04N 9/3102; H04N 9/3105; H04N 9/3108; H04N 9/3111; H04N 9/3114; H04N 9/3117
USPC ........................ 353/81, 98, 99, 30, 31, 33, 37
See application file for complete search history.

(56) References Cited

U.S. PATENT DOCUMENTS

| | | |
|---|---|---|
| 5,365,314 A | 11/1994 | Okuda et al. |
| 7,639,933 B2 | 12/2009 | Seo et al. |
| 9,213,223 B2 | 12/2015 | Mashitani |
| 2011/0019157 A1 | 1/2011 | He |
| 2011/0019158 A1* | 1/2011 | He ..................... H04N 9/317 353/33 |
| 2016/0154294 A1 | 6/2016 | Fujioka et al. |
| 2016/0198134 A1 | 7/2016 | Mikawa et al. |

FOREIGN PATENT DOCUMENTS

| | | |
|---|---|---|
| JP | 2008-070494 | 3/2008 |
| JP | 2008-225158 | 9/2008 |
| JP | 2008-292647 | 12/2008 |

(Continued)

*Primary Examiner* — Ryan Howard
(74) *Attorney, Agent, or Firm* — Oblon, McClelland, Maier & Neustadt, L.L.P.

(57) ABSTRACT

An image projection apparatus includes an optical modulation element, a lighting optical unit, a projection unit, and a shifting unit. The optical modulation element generates an image from light emitted from a light source. The lighting optical unit is configured to guide the light emitted from the light source to the optical modulation element. The projection unit projects the image generated by the optical modulation element. The shifting unit relatively shifts the optical modulation element with respect to the lighting optical unit. The shifting unit also generates driving forces to shift the optical modulation element, respectively, in a vertical direction, in a direction of being inclined by a first angle less than 90 degrees with respect to the vertical direction, and in a direction of being inclined by a second angle less than 90 degrees in an opposite side of the first angle.

8 Claims, 11 Drawing Sheets

(56) References Cited

FOREIGN PATENT DOCUMENTS

| | | |
|---|---|---|
| JP | 2011-027821 | 2/2011 |
| JP | 2012-181386 | 9/2012 |
| JP | 2016-085363 | 5/2016 |
| JP | 2016-102945 | 6/2016 |
| JP | 2016-102946 | 6/2016 |
| JP | 2016-126250 | 7/2016 |
| WO | 2016/067519 A1 | 5/2016 |

* cited by examiner

IMAGE PROJECTION APPARATUS

CROSS-REFERENCE TO RELATED APPLICATIONS

The present application claims priority under 35 U.S.C. § 119 to Japanese Patent Application No. 2015-142359, filed Jul. 16, 2015. The contents of which are incorporated herein by reference in their entirety.

BACKGROUND OF THE INVENTION

1. Field of the Invention

The present invention relates to an image projection apparatus.

2. Description of the Related Art

Conventionally, a technique of shifting, by a half pixel, a projection image in an oblique direction of 45 degrees in minute cycles has been known as a method of realizing a high resolution of a projection image in an image projection apparatus (typically, a projector). As the technique of shifting a projection image by a half pixel, a method of shifting an image display element for image formation has been known.

Japanese Unexamined Patent Application Publication No. 2008-225158 discloses a configuration of arranging four electromagnets and four permanent magnets in a manner of facing with each other and controlling a driving through a use of suction and repulsion forces, for the purpose of realizing an image stabilization with a little electric power with respect to an imaging element arranged on a stage member supported slidably with a fixation supporting substrate, for example.

SUMMARY OF THE INVENTION

According to one aspect of the present invention, an image projection apparatus includes an optical modulation element, a lighting optical unit, a projection unit, and a shifting unit. The optical modulation element is configured to generate an image from light emitted from a light source. The lighting optical unit is configured to guide the light emitted from the light source to the optical modulation element. The projection unit is configured to project the image generated by the optical modulation element. The shifting unit is configured to relatively shift the optical modulation element with respect to the lighting optical unit. The shifting unit includes a first driver, a second driver, and a third driver. The first driver is configured to generate a driving force to shift the optical modulation element in a vertical direction. The second driver is configured to generate a driving force to shift the optical modulation element in a direction of being inclined by a first angle that is less than 90 degrees with respect to the vertical direction. The third driver is configured to generate a driving force to shift the optical modulation element in a direction of being inclined by a second angle that is less than 90 degrees in an opposite side of the first angle with respect to the vertical direction.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1A:
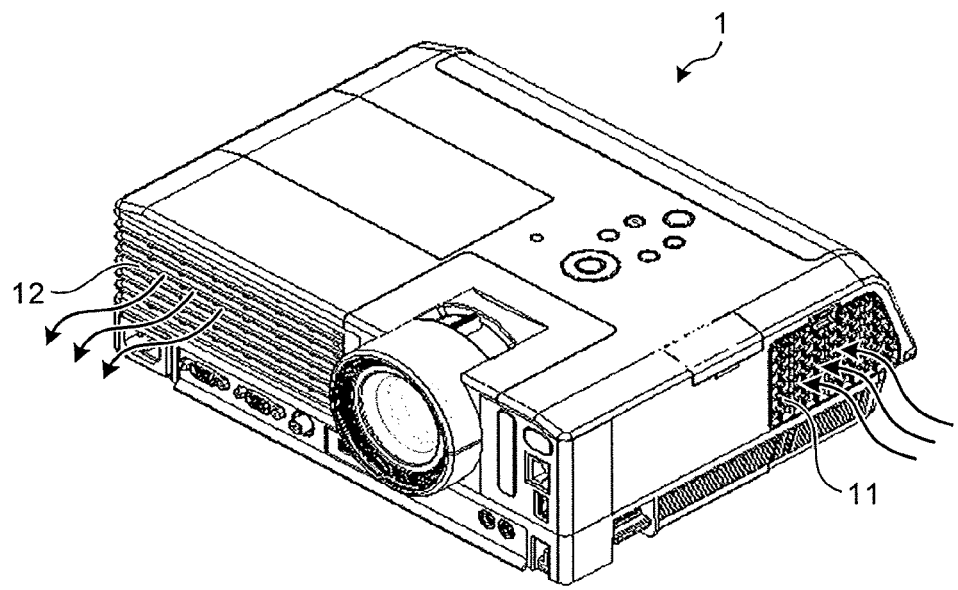
FIGS. 1A and 1B are external views of an image projection apparatus according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Figure 1B:
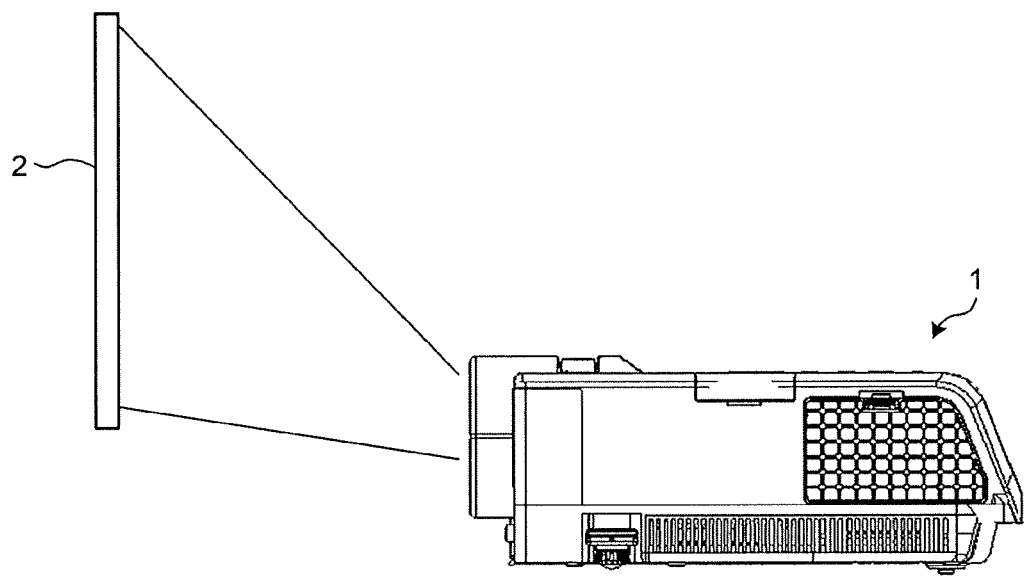

FIG. 1A is a perspective view of an image projection apparatus 1 according to an embodiment and FIG. 1B is a side view of the image projection apparatus 1. FIG. 1B illustrates a state where a screen (a projection receiving object) 2 to which an image is projected is irradiated with projection light emitted from the image projection apparatus 1.

The image projection apparatus 1 generates a screen image based on screen image data input from a personal computer, a video camera, and the like, and projects and displays the screen image on a screen 2 and the like. A liquid crystal projector which is widely known as the image projection apparatus 1 has advanced in recent years in realization of a high resolution in a liquid crystal panel, an improvement in brightness associated with realization of a high efficiency in a light source lamp, realization of a price reduction, and the like. A small lightweight projector using a DMD (Digital Micro-mirror Device) has become popular and come to be used widely not only in an office and a school but also at home. Especially, a projector of a front projection type has had an improvement in portability and come to be used in a small conference on the scale of a few persons.

A projector as the image projection apparatus 1 is required to project a large screen image (to make a projection screen large) and to make an "external projection space necessary for the projector" as small as possible. In recent years, a projector whose optical engine performance is improved, whose projection distance is one to two meters, and whose projection size reaches 60 to 80 inches has come to prevail. While, in a case of a conventional projector whose projection distance is long, there are desks for conference between the projector and the screen 2 and the projector is arranged at a back side of the desks, it has come to be possible in recent years to arrange a projector at a front side of the desks in accordance with a shortened projection distance and to freely avail of the back side space of the projector. Since a projector internally houses a light source lamp and a large number of electronic substrates, an internal temperature of the projector rises as time proceeds after activation. This problem of the temperature rise is prominent in recent years during which a downsizing of a chassis of a projector has advanced and an air cooling system which uses an artificial air current by being provided, as a measure, with a fresh air inlet 11 and an exhaust air outlet 12 as illustrated in FIG. 1A so that the internal temperature does not exceed an upper temperature limit of constituting components in the inside of the projector, is adopted generally.

Figure 2A:
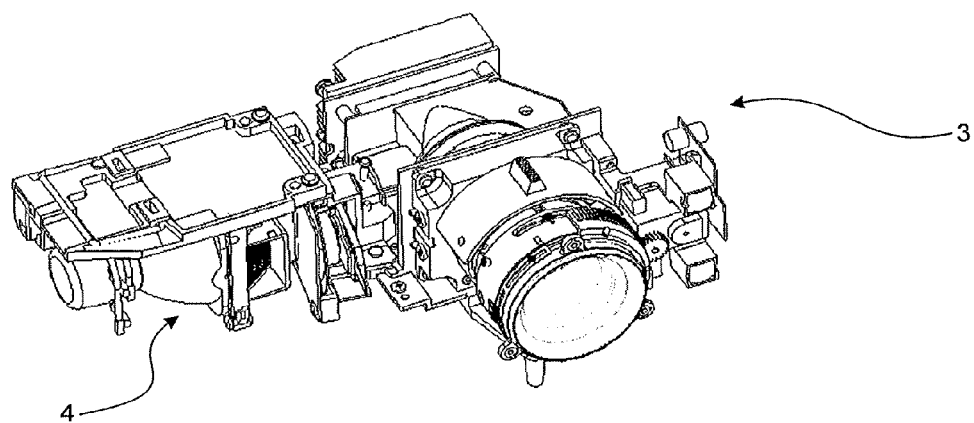
FIGS. 2A and 2B illustrate an arrangement and a configuration of an optical engine and a light source unit.
Figure 2B:
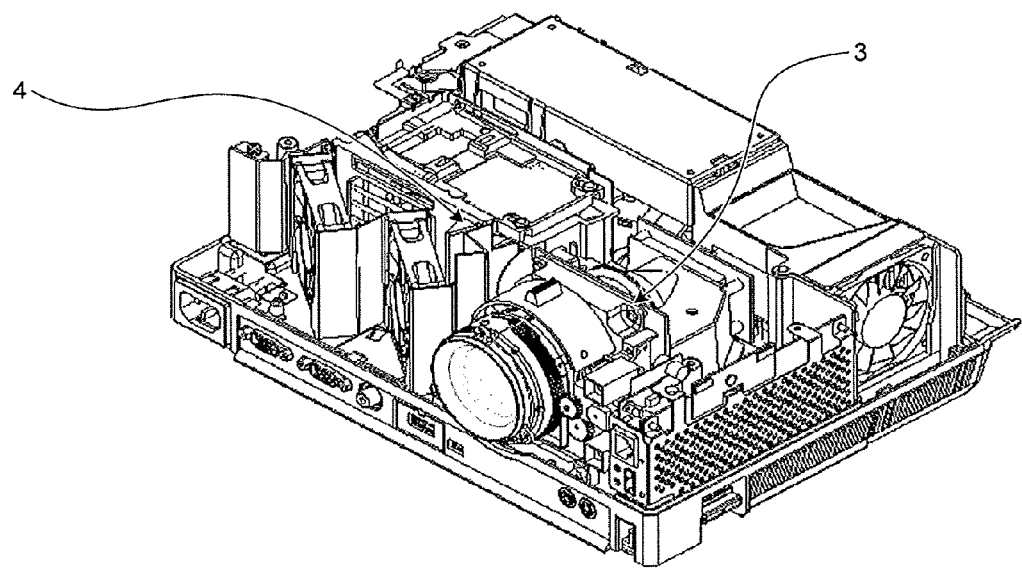

FIGS. 2A and 2B illustrate an arrangement and a configuration of an optical engine 3 and a light source unit 4 when an outer cover of the image projection apparatus 1 is unfixed. A high pressure mercury lamp is adopted as the light source unit 4 in the embodiment. For a pathway along which a light emitted from the light source unit 4 forms an image on the screen 2, a lighting unit 3a, to be explained later, of the optical engine 3 is first irradiated with the light from the light source unit 4. In the lighting unit 3a, radiated white light is dispersed into RGB and the dispersed light is guided to an image display element unit 8, which will be explained later. After that, the light guided to the image display element unit 8 is configured to be formed into an image depending on a modulation signal, be enlarged and projected in a projection unit 3b, which will be explained later, and reach the screen 2.

Figure 3:
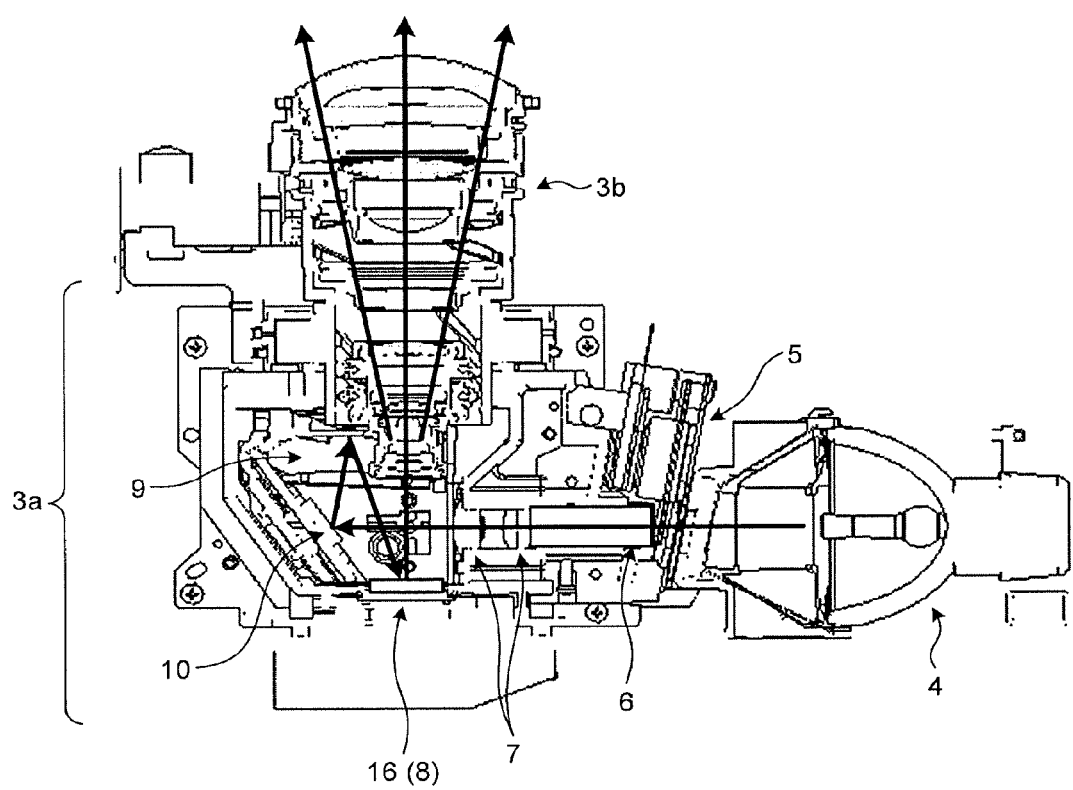
FIG. 3 illustrates an example of a configuration of the optical engine.

FIG. 3 illustrates an example of a configuration of the optical engine 3. As illustrated in FIG. 3, the optical engine 3 according to the embodiment is mainly provided with the lighting unit 3a, the projection unit 3b, and the like. The lighting unit 3a, which is an example of a lighting optical unit, guides the light emitted from the light source unit 4 to a DMD 16 provided in the image display element unit 8. The projection unit 3b, which is an example of a projection unit, enlarges and projects the image generated by the DMD 16 (image display element unit 8) to the screen 2.

In the optical engine 3 according to the embodiment, the white light emitted from the light source unit 4 is first converted into each color of RGB by a color wheel 5 of a disk-like shape. After that, the light emitted from the color wheel 5 is configured to be guided to an inside of the lighting unit 3a by a light tunnel 6 which is formed in a tubular shape by attaching plates of glass to each other, corrected in chromatic aberration by two relay lenses 7 arranged right behind the light tunnel 6, and focused into the image display element unit 8 provided with the DMD 16 by a plane mirror 10 and a concave mirror 9. Here, the DMD 16 is configured to have a mirror face which is formed by a plurality of micro mirrors and of approximately rectangular shape and to perform a time-division driving of each micro mirror based on screen image data to process and reflect the projection light into a predetermined screen image. Here, it is possible to consider that the DMD 16, which is an example of an optical modulation element, generates an image by using the light emitted from the light source unit 4. The image projection apparatus 1 according to the embodiment is a projector whose DMD 16 faces the screen 2.

There are two kinds of directions to which the DMD 16 reflects and light which is used in forming screen image data is configured to be reflected to a projection lens and light which is discarded without being used is configured to be reflected to an OFF optical plate. The light which is used in forming screen image data is reflected to the side of the projection unit 3b, enlarged in passing through a plurality of projection lenses, and projected onto the screen 2 as enlarged screen image light. Here, the relay lens 7, the concave mirror 9, the plane mirror 10, the image display element unit 8 which are arranged in the inside of the lighting unit 3a, and an incident side of the projection unit 3b are retained by a not-illustrated housing in a manner of covering those components and a matching surface of the housing is sealed by a sealing member as a dust-proof construction.

The image projection apparatus 1 according to the embodiment is provided with a CPU (Central Processing Unit), a ROM (Read Only Memory), a RAM (Random Access Memory), and the like. The CPU expands in the RAM and executes programs stored in the ROM and the like to control the operation of the image projection apparatus 1.

Figure 4:
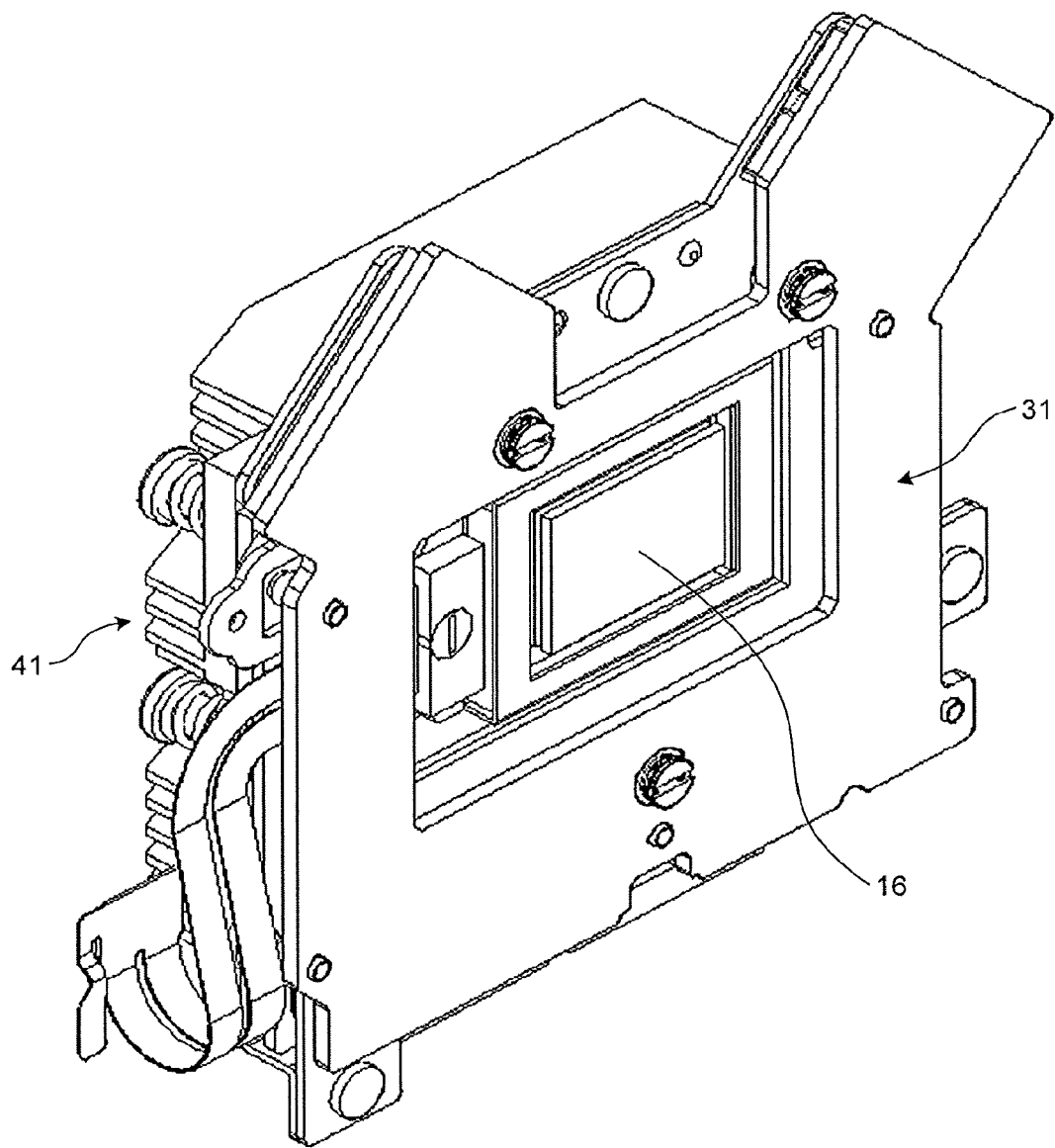
FIG. 4 illustrates an example of a configuration of an image display element unit.

Next, a specific configuration of the image display element unit 8 will be explained. FIG. 4 illustrates an example of a configuration of the image display element unit 8. As illustrated in FIG. 4, the image display element unit 8 is configured by two units, i.e., a fixation unit 31 and a movable unit 41. A voice coil 43 (an example of a coil), which is arranged at the side of the movable unit 41 and will be explained later, is configured to move relatively with respect to the fixation unit 31 by receiving the Lorentz force arising with a magnet 37, which is arranged at the side of the fixation unit 31 and will be explained later. A combination of the voice coil 43 and the magnet 37 generates a driving force that causes the DMD 16 to relatively move with respect to the lighting unit 3a and will sometimes be referred to as "actuator" in the explanation below. As will be explained later, the image projection apparatus 1 according to the embodiment includes four actuators and the four voice coils 43 are provided at positions facing respective magnets 37 to be paired with the respective voice coils 43. The four actuators serve as a shifting unit that relatively shifts the DMD 16 with respect to the lighting unit 3a.

Figure 5:
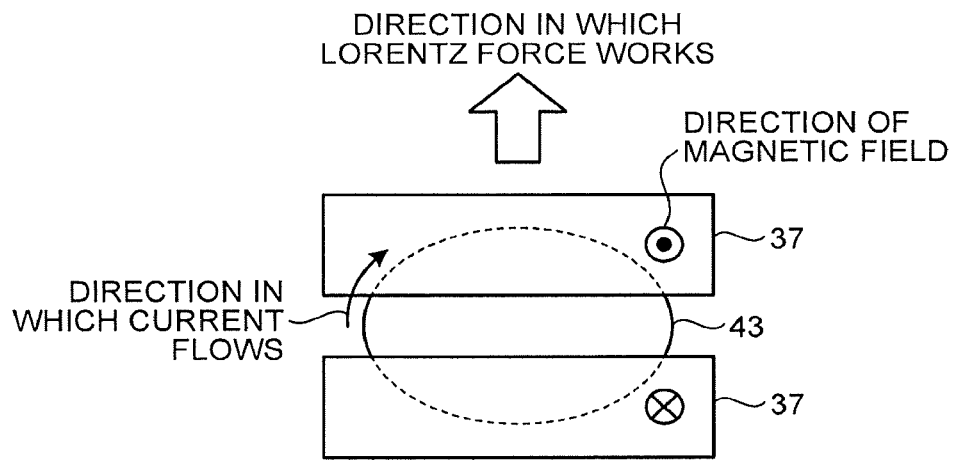
FIG. 5 is an explanatory view of the Lorentz force arising between a voice coil and a magnet.
Figure 6:
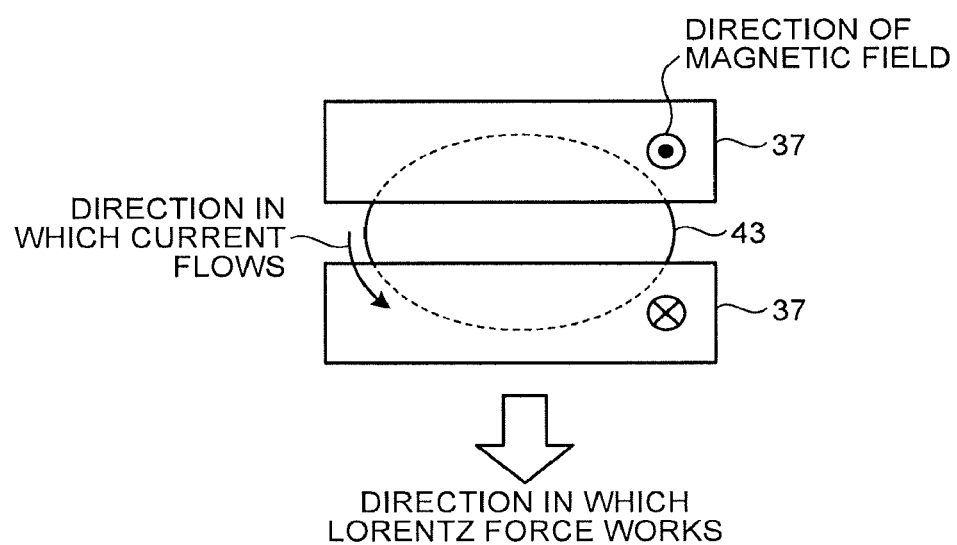
FIG. 6 is another explanatory view of the Lorentz force arising between the voice coil and the magnet.

When a relation between a direction of a magnetic field by the magnets 37 and an electric current flowing in the voice coil 43 is as illustrated in FIG. 5, for example, the Lorentz force works in the direction indicated by an arrow in FIG. 5. When the direction of the electric current flowing in the voice coil 43 becomes reverse, the Lorentz force works in the opposite direction of the direction illustrated in FIG. 5 as illustrated in FIG. 6.

Figure 7:
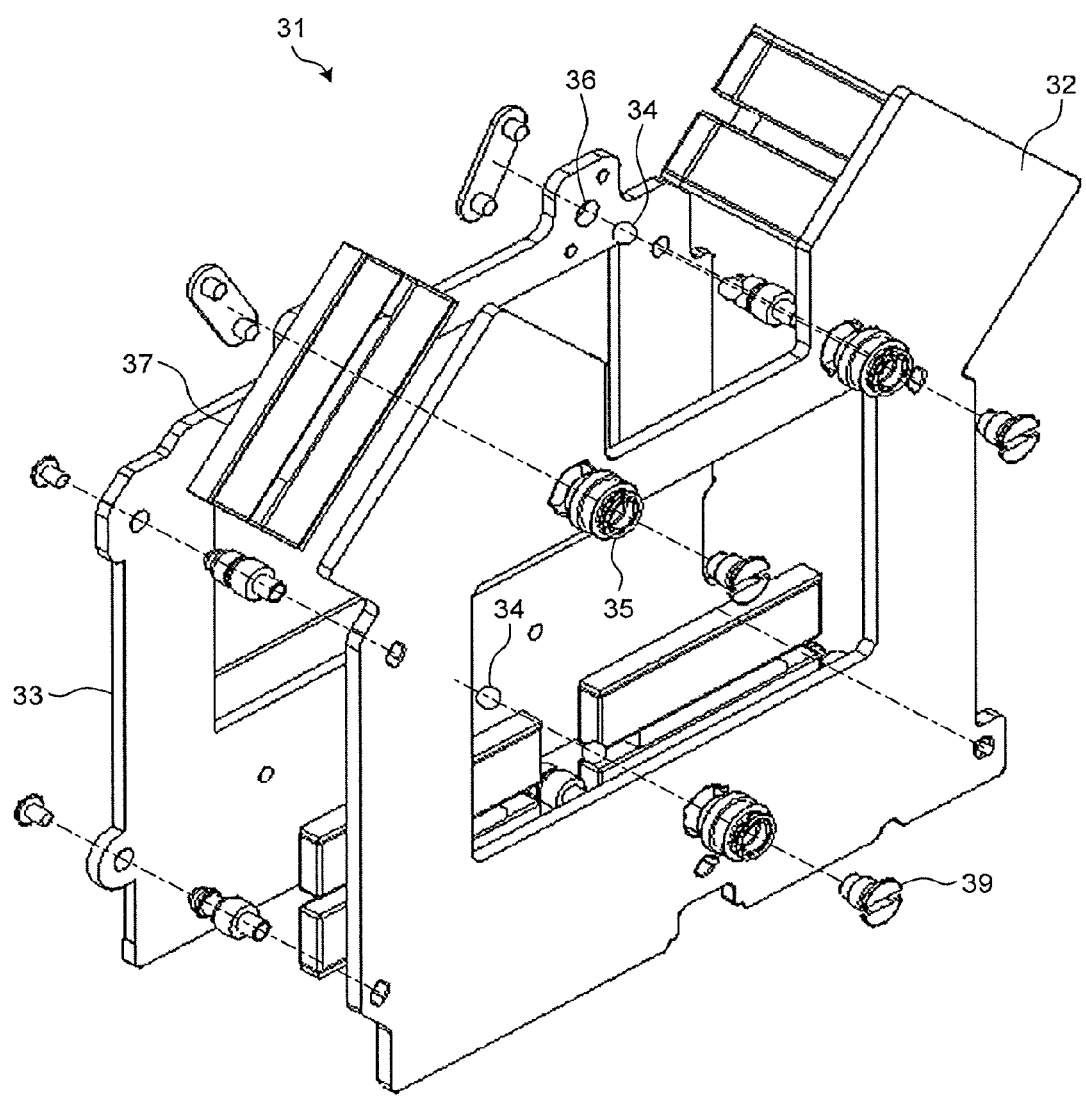
FIG. 7 is an exploded perspective view of a fixation unit.
Figure 8:
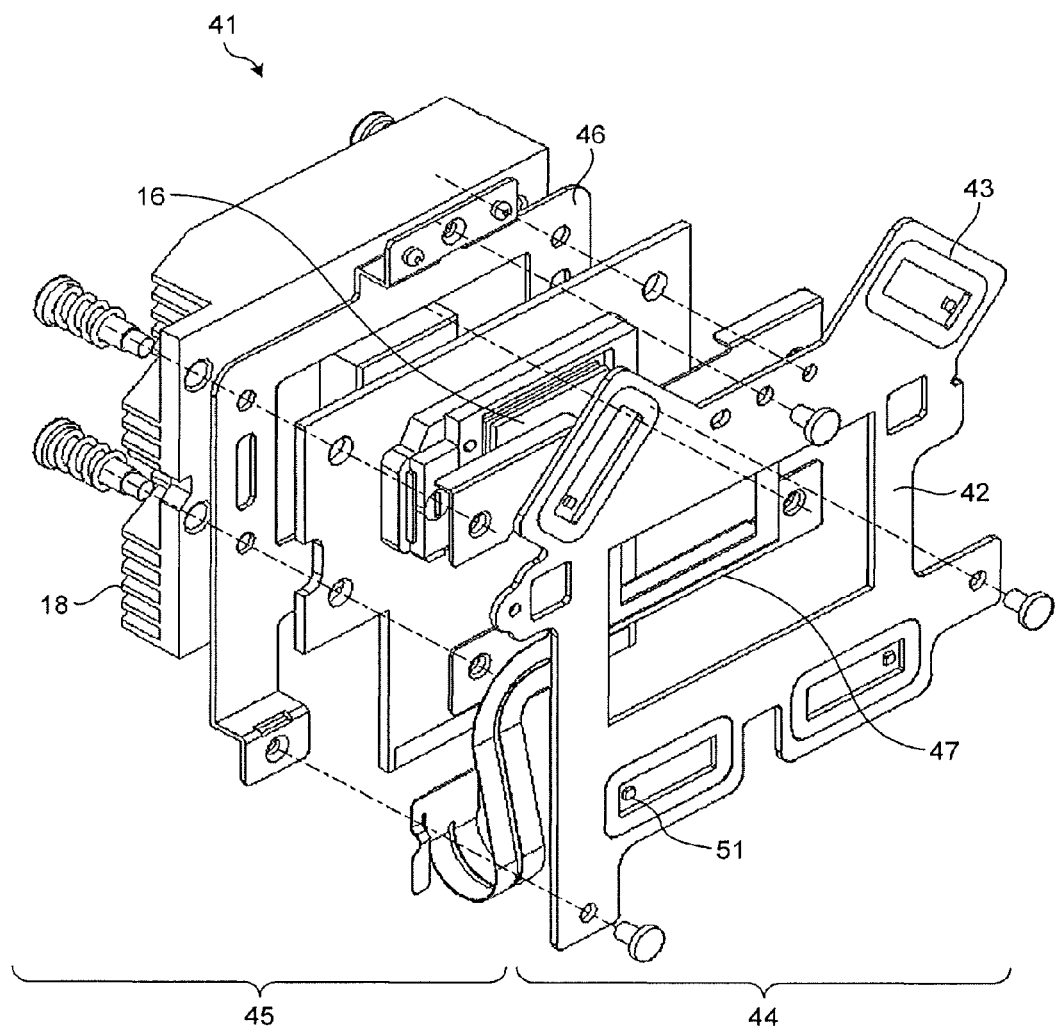
FIG. 8 is an exploded perspective view of a movable unit.

FIG. 7 is an exploded perspective view of the fixation unit 31. FIG. 8 is an exploded perspective view of the movable unit 41. The fixation unit 31 has two significant functions, one of which is to support the movable unit 41 and the other of which is to support the movement of the movable unit 41. Specifically, the fixation unit 31 supports the movable unit 41 by sandwiching a movable plate 42 in the inside of the movable unit 41 by a plurality of spherical bodies 34 provided in the inside of the fixation unit 31. The spherical bodies 34 are arranged at respective positions between a top plate 32 and the movable plate 42 and between a base plate 33 and the movable plate 42, the spherical body 34 arranged at the side of the top plate 32 is configured to be housed in a spherical body retainer 35 provided in the top plate 32, and the spherical body 34 arranged at the side of the base plate 33 is configured to be housed in a spherical body receiver 36 provided at the side of the base plate 33. While it can be pointed out that a relation in friction and slip varies depending on a clearance between each plate and the spherical bodies 34, the clearance is adjusted by a spherical body position adjusting screw 39 provided at the side of the top plate 32.

As for the support of the movement of the movable unit 41 as the other one function of the fixation unit 31, the magnet 37 is arranged at the side of the fixation unit 31 and the voice coil 43 is arranged at the side of the movable unit 41. A control circuit (this may be the CPU explained above or may be a circuit different from the CPU) is configured to perform a control of causing an electric current to flow in the voice coil 43 to generate the Lorentz force, so that the movable unit 41 moves. As explained above, since the direction of the Lorentz force changes depending on the direction in which the electric current flows and the level of the Lorentz force changes depending on the level of the electric current, it is possible to shift the movable unit 41 including the DMD 16 in a desired direction by a desired amount.

Figure 9:
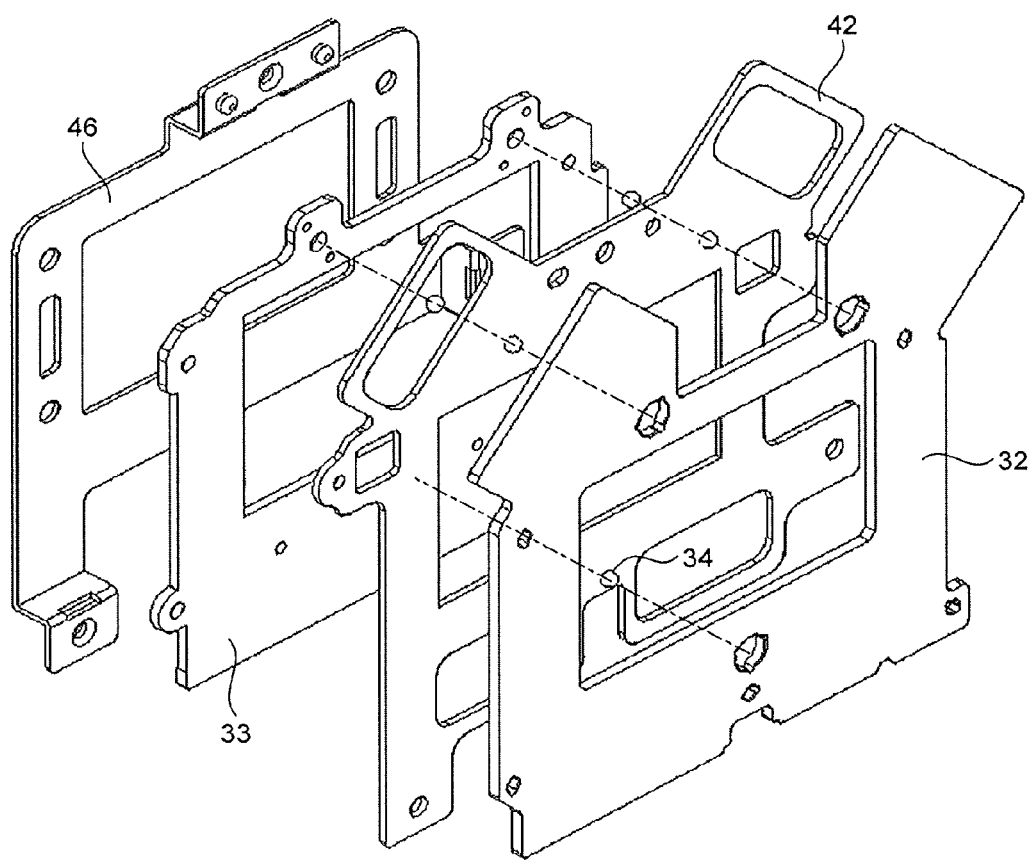
FIG. 9 illustrates a positional relation of plates.

On the other hand, retaining the DMD 16 can be listed as a function of the movable unit 41. While the DMD 16 is generally configured to be sandwiched between a lighting housing and a heat sink 18, the DMD 16 is covered by a DMD retaining bracket 47 as one of the constituting components of the movable unit 41 to retain the DMD 16 without pressing against the lighting housing in this configuration, as illustrated in the exploded perspective view in FIG. 8. The movable unit 41 is configured by two main units, i.e., a movable plate unit 44 and a DMD retaining unit 45. The movable plate unit 44, which is configured to mainly include the movable plate 42, the voice coil 43, and a hole element 51, moves relatively with respect to the fixation unit 31. The DMD retaining unit 45, which is configured to mainly include the DMD 16, the heat sink 18, and the DMD retaining bracket 47, retains the DMD 16. A joint plate 46, which is arranged in the inside of the DMD retaining unit 45, is fastened with a screw onto the movable plate 42 to transmit a movement amount of the movable plate unit 44 to the DMD retaining unit 45 and realize the movement of the DMD 16. Since the movable plate 42 is supported by being sandwiched by the spherical bodies 34 in the inside of the fixation unit 31 as explained above, the movable plate 42 itself is arranged between the top plate 32 and the base plate 33 of the fixation unit 31. FIG. 9 illustrates a positional relation of the plates.

Figure 10:
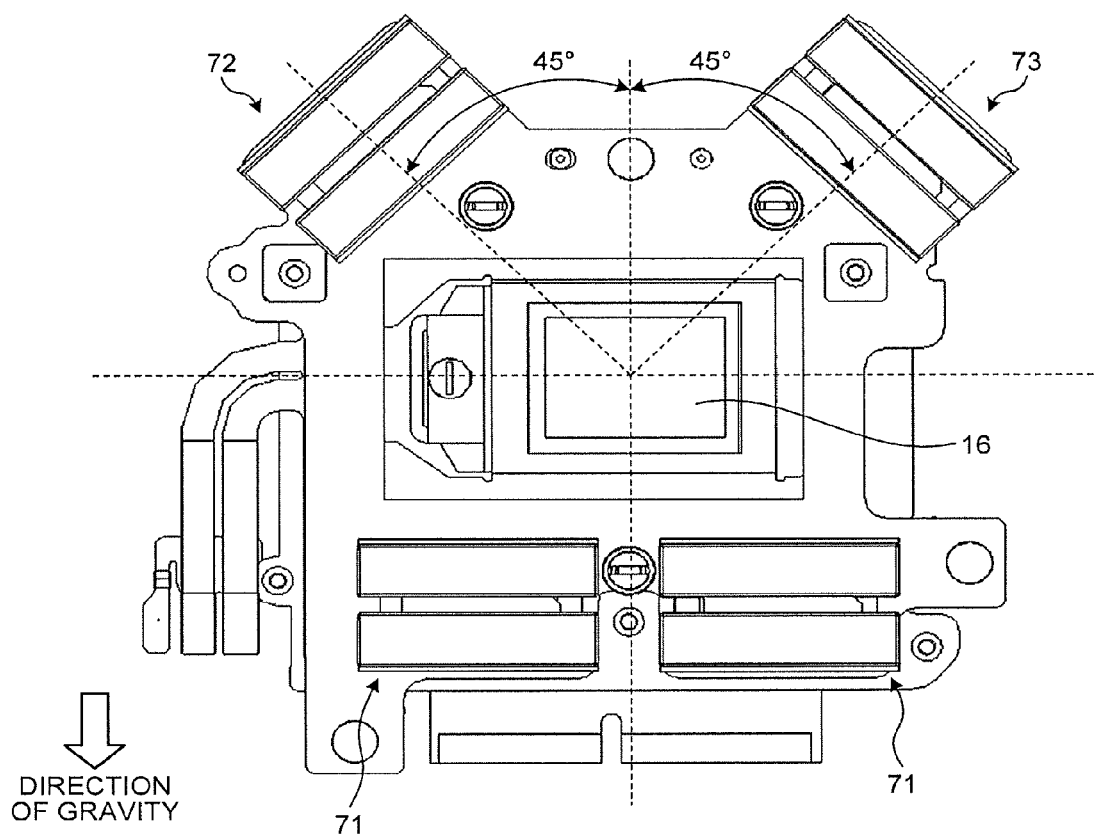
FIG. 10 is an explanatory view of an arrangement of actuators.

Next, the actuator will be explained. As illustrated in FIG. 10, the image projection apparatus 1 according to the embodiment is provided with four actuators, i.e., a pair of first actuators (first drivers) 71, a second actuator (second driver) 72, and a third actuator (third driver) 73. The first actuator 71 generates a driving force that causes the DMD 16 to move in the vertical direction (direction in which the gravity works). In this example, the pair of first actuators 71 are arranged at positions different from each other in the horizontal direction. The second actuator 72 generates a driving force that causes the DMD 16 to move in a direction of being inclined by a first angle which is less than 90 degrees with respect to the vertical direction. The third actuator 73 generates a driving force that causes the DMD 16 to move in a direction of being inclined by a second angle which is less than 90 degrees on the opposite side of the first angle with respect to the vertical direction. In this example, both of the first angle and the second angle are equally 45 degrees. Each of the first actuators 71, the second actuator 72, and the third actuator 73 includes the magnet 37 and the voice coil 43 which is provided in a manner of facing the magnet 37 and in which an electric current flows.

In the example in FIG. 10, the combination of the voice coil 43 and the magnet 37 constituting the second actuator 72 and the combination of the voice coil 43 and the magnet 37 constituting the third actuator 73 are arranged in a manner of being inclined by 45 degrees in the opposite directions with each other with respect to the combinations of the voice coils 43 and the magnets 37 constituting the first actuators 71.

Here, there are behaviors, required in the embodiment, for three-degree of freedom including translational behaviors in a short side direction and in a long side direction and a rotational behavior of the DMD 16, and it can generally be said that at least three actuators are necessary for realizing the behaviors for the three-degree of freedom. Therefore, it is possible by three actuators, i.e., a pair of actuators that generate a driving force in the short side direction of the DMD 16 and one actuator that generates a driving force in the long side direction to realize the behaviors for three-degree of freedom, for example. However, since the actuator that generates the driving force in the long side direction of the DMD 16 generates the driving force only in one direction of the long side direction in the case of generating the driving force only by the three actuators as explained above, the actuator arranged in the long side direction is not able to support the driving force in the short side direction. Here, since a projector generally projects a horizontally long screen image onto a vertical wall surface or the screen 2, when an embedded state of the DMD 16 inside the projector is observed, the DMD 16 is arranged so that the short side direction thereof is the vertical direction in which the gravity works and the long side direction thereof is the horizontal direction.

While it is difficult in the case of realizing the behaviors for three-degree of freedom by three actuators to generate sufficient driving force in the vertical direction without increasing the number of actuators and the power consumption as explained, the second actuator 72 and the third actuator 73 which generate the driving force in the horizontal direction are also able to generate the driving force in the vertical direction in the configuration illustrated in FIG. 10 according to the embodiment. This is because the second actuator 72 generates the driving force in the direction of being inclined by 45 degrees with respect to the vertical direction, the third actuator 73 generates the driving force in the direction of being inclined by 45 degrees on the opposite side of the 45 degrees of the second actuator 72 with respect to the vertical direction, and vectors of the respective driving forces generated by the second actuator 72 and the third actuator 73, which are oriented at the angle of 45 degrees inclined on the opposite sides with each other with respect to the vertical direction, thereby come to include not only horizontal component but also vertical component.

The driving forces generated by the actuators and a driving of the movable plate 42 in generating the driving forces will be explained below. While the translational behavior in the vertical direction (Z axis direction in the example in FIG. 11) is realized by causing an electric current to flow in the same direction in the respective voice coils 43 of the pair of the first actuators 71 as illustrated in (A) in FIG. 11, the rotational behavior is realized by causing the electrical current to flow in the opposite directions with each other as illustrated in (B) in FIG. 11.

Figure 11:
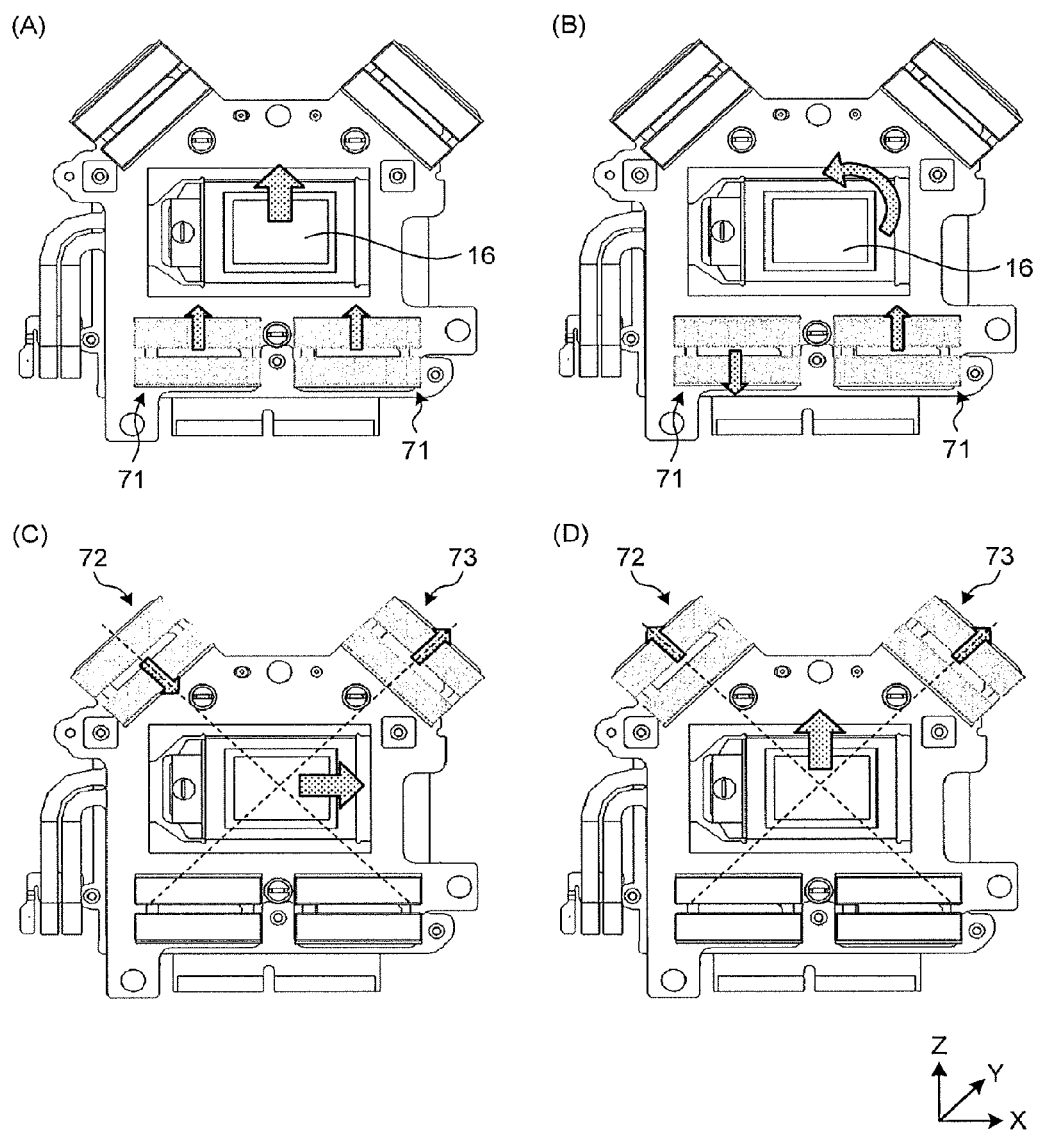
FIG. 11 illustrates a driving by the actuators.

On the other hand, the translational behavior in the horizontal direction (X axis direction in the example in FIG. 11) is realized by causing the electric current to flow in the opposite directions with each other in the respective voice coils 43 of the second actuator 72 and the third actuator 73 as illustrated in (C) in FIG. 11. Moreover, since it is possible to generate a force in the vertical direction (force in the Z axis direction in the example in FIG. 11) by a resultant force when the electric current is caused to flow in the same direction in the respective voice coils 43 of the second actuator 72 and the third actuator 73 as illustrated in (D) in FIG. 11, it becomes possible to support the driving force in the vertical direction with the respective driving forces of the second actuator 72 and the third actuator 73 in uplifting the heavy movable unit 41 including the DMD 16 and the heat sink 18 in the vertical direction.

Figure 12:
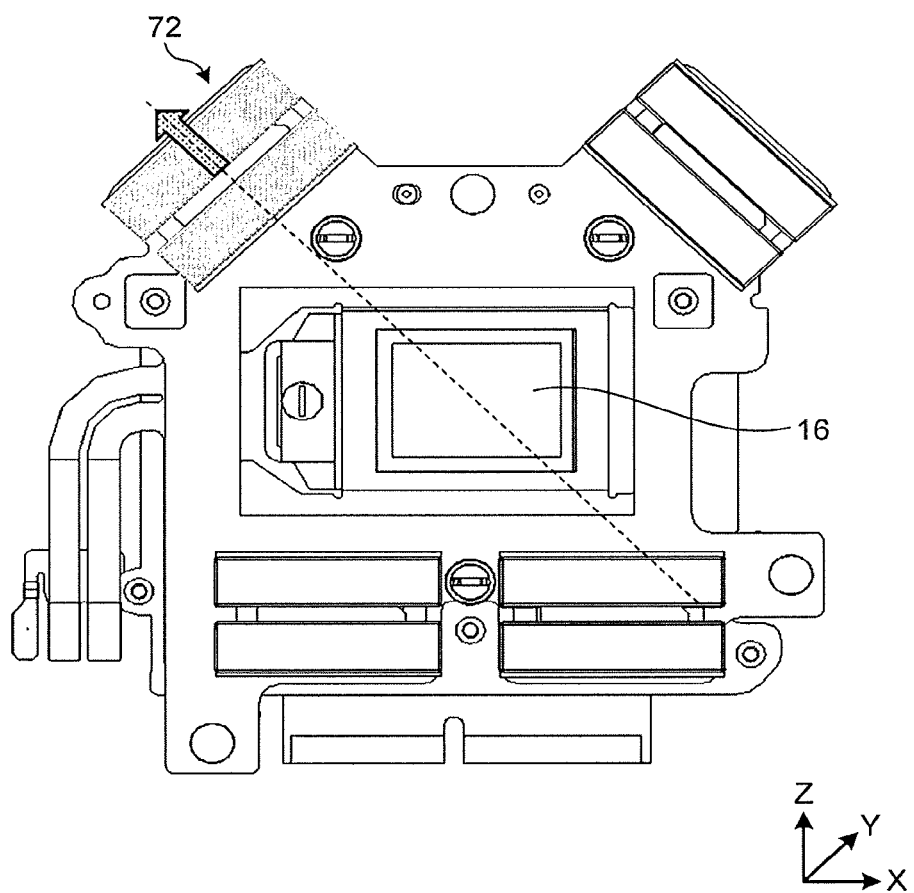
FIG. 12 is an explanatory view of the driving by the actuators.

There is a high resolution behavior as another function according to the embodiment. The high resolution behavior, which is an behavior of shifting the DMD 16 by a half pixel in the oblique direction of 45 degrees, enables forming an intermediate image in a projection image, so that a pixel density is enhanced and a pseudo high resolution image can be generated. It is necessary for realizing the high resolution behavior with an easy control system to reproduce a motion in the oblique direction of 45 degrees by a behavior for one degree of freedom, and it can therefore be said that an actuator that generates a driving force in the oblique direction of 45 degrees is required. As explained, the second actuator 72 that generates a driving force in the direction of being inclined by 45 degrees with respect to the vertical direction and the third actuator 73 that generates a driving force in the direction of being inclined by 45 degrees on the opposite side of the 45 degrees of the second actuator 72 are provided according to the embodiment. As illustrated in FIG. 12 for example, the electric current is caused to flow only in the voice coil 43 of the second actuator 72 to generate a driving force in the direction of being inclined by 45 degrees with respect to the vertical direction, which thereby easily realizes the high resolution behavior. In other words, it can be said that the configuration according to the embodiment has a merit in realizing high resolution.

According to the embodiment, it is possible to generate a driving force in the vertical direction sufficiently without increasing the number of actuators and power consumption.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image projection apparatus comprising:
    an optical modulation element to generate an image from light emitted from a light source, the optical modulation element having a long side direction and a short side direction;
    a lighting optical unit to guide the light emitted from the light source to the optical modulation element;
    a projection unit to project the image generated by the optical modulation element; and
    a shifting unit to relatively shift the optical modulation element with respect to the lighting optical unit, wherein
    the shifting unit includes
        a first driver to generate a driving force to shift the optical modulation element in a gravity direction,
        a second driver to generate a driving force to shift the optical modulation element in a direction of being inclined by a first angle that is less than 90 degrees with respect to the gravity direction, and
        a third driver to generate a driving force to shift the optical modulation element in a direction of being inclined by a second angle that is less than 90 degrees in an opposite side of the first angle with respect to the gravity direction,
    wherein the short side direction of the optical modulation element is a same direction as the gravity direction.

2. The image projection apparatus according to claim 1, wherein the first angle is equal to the second angle.

3. The image projection apparatus according to claim 2, wherein each of the first angle and the second angle is 45 degrees.

4. The image projection apparatus according to claim 1, wherein each of the first driver, the second driver, and the third driver includes a magnet and a coil that is arranged to face the magnet such that an electric current flows in the coil.

5. The image projection apparatus according to claim 1, wherein the optical modulation element faces a screen on which the image is projected.

6. The image projection apparatus according to claim 1, wherein the first driver includes a plurality of pairs of a magnet and a coil, the magnets being arranged in a direction perpendicular to the gravity direction.

7. The image projection apparatus according to claim 6, wherein the driving force applied to the optical modulation element by each of the pairs of the magnet and the coil is only in the gravity direction.

8. The image projection apparatus according to claim 1, wherein the short side direction of the optical modulation element is perpendicular to the long side direction of the optical modulation element.

* * * * *